(No Model.)
P. PATTERSON.
APPARATUS FOR MAKING TUBING.
No. 444,568. Patented Jan. 13, 1891.
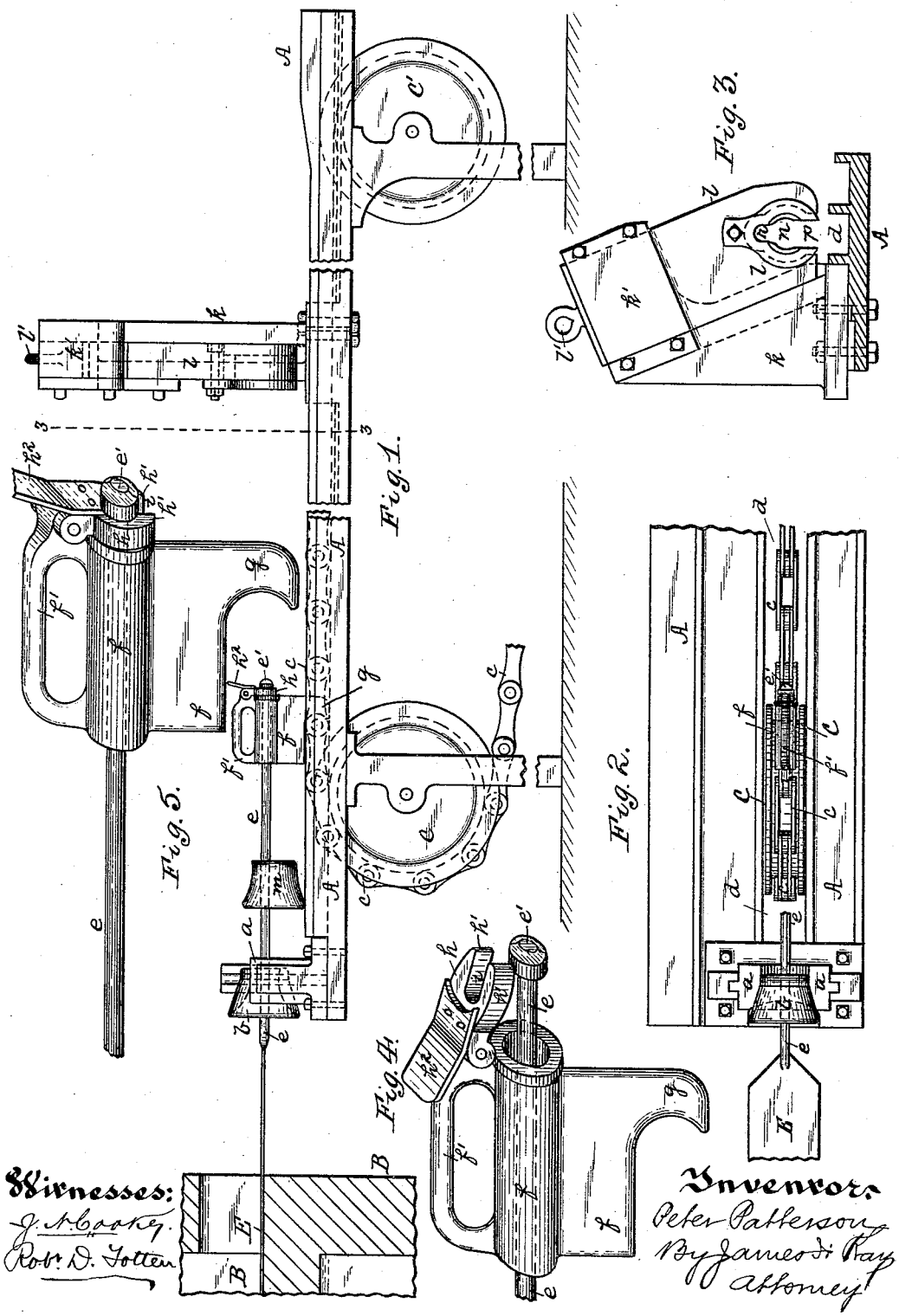
Witnesses:
J. N. Cooke
Rob. D. Totten
Inventor:
Peter Patterson
By James D. Ray
Attorney

UNITED STATES PATENT OFFICE.

PETER PATTERSON, OF McKEESPORT, PENNSYLVANIA, ASSIGNOR TO THE NATIONAL TUBE WORKS COMPANY, OF SAME PLACE.

APPARATUS FOR MAKING TUBING.

SPECIFICATION forming part of Letters Patent No. 444,568, dated January 13, 1891.

Application filed July 5, 1890. Serial No. 357,804. (No model.)

*To all whom it may concern:*

Be it known that I, PETER PATTERSON, a resident of McKeesport, in the county of Allegheny and State of Pennsylvania, have invented a new and useful Improvement in Apparatus for Making Tubing; and I do hereby declare the following to be a full, clear, and exact description thereof.

My invention relates to apparatus for drawing and welding tubing, its object being to improve the apparatus heretofore employed for this purpose, in which the plate or skelp is drawn through a bell or die in order to bend or bend and weld the same, such apparatus being well illustrated in Letters Patent No. 341,162, granted to me on the 4th day of May, 1886, on which Letters Patent the present invention is to some extent an improvement.

The usual form of apparatus for bending or bending and welding this tubing has consisted in a draw-bench having a bell-holder or bending-die mounted at the forward end and a traveling chain mounted on suitable sprockets and pulleys and traveling within the bench, and a buggy running on tracks on the draw-bench and having tongs or like devices which engage with the plate or blank or with the drawing rod or tag secured thereto, and which buggy was provided with a hook which engaged with the chain, so drawing the blank through the bending or welding die.

The principal objection found in connection with this way of making tubing was that it required a boy to move the buggy along the draw-bench and operate the buggy, engaging it with and disengaging it from the chain, and bringing it back to the forward end thereof, this being rather difficult work, requiring considerable skill.

One object of my invention is to overcome the necessity of this buggy by providing a sleeve which can engage directly with the drawing-tag, and is provided with a hook which can engage with the drawing-chain, these sleeves being small, so that many of them may be employed, and after the sleeve is connected with the drawing-chain, it acting to draw the blank through the bending or welding bell, and holding it in engagement with the chain until the sleeve reaches the rear end of the draw-bench, when it can be easily disengaged therefrom.

In the employment of a second bell-holder in such apparatus, such as described in the patent granted to me as aforesaid, as the bell-holder had the opening in the side thereof it was necessary to employ a movable bell-holder and one which would pass across the course of the drawing rod and tube and intercept the second bell, which rested on this rod and hold it during the second drawing operation. I have been enabled to improve this construction in several particulars by the employment of a bell-holder having an open base, the engaging device between the tag and chain passing through this bell-holder, and the bell-holder intercepting and holding the second welding-bell and so overcoming the necessity of an operator to control the movement of said second bell-holder.

The particular improvements embodying my invention will be hereinafter more specifically described and claimed.

To enable others skilled in the art to make and use my invention, I will describe the same more fully, referring to the accompanying drawings, in which—

Figure 1 is a side view of a welding-bench illustrating my invention. Fig. 2 is a top view of the forward end thereof. Fig. 3 is a cross-section on the line III III, Fig. 1. Fig. 4 is a perspective view of the sleeve engaging with the drawing-tag, showing the operation of passing the same over the tag; and Fig. 5 is a like view showing the position occupied by the sleeve and tag during the drawing operation.

Like letters of reference indicate like parts in each.

The draw-bench A is of the ordinary or any approved construction, having at its forward end, in the apparatus illustrated, the bell-holder $a$, in which the welding-bell $b$ is shown, though the apparatus is well adapted to the bending of plates into skelp form, in which case a skelping-die would be located at the forward end of the draw-bench. The drawing-chain $c$ is mounted on the sprockets or pulleys C C', and travels in the ordinary guideway $d$ in the body portion of the draw-bench in position to be engaged, as hereinafter described, by the sleeve engaging with the drawing-tag. The furnace B is of any approved construction, while the plate E, which is to be either bent into skelp form or welded into tubing, is of the proper width and size, corresponding to the bending or welding die, and has secured thereto by welding or otherwise the drawing-tag $e$, this drawing-tag in the approved constructions being provided with the head $e'$. Engaging with the drawing-tag $e$ is the sleeve $f$, which in the construction shown slips over the drawing-tag, and has a hook $g$, which engages directly with the drawing-chain $c$ under the sleeve.

By the term "sleeve" is intended a separate hollow piece which when passed around the tag may be suspended from the same, and when engaging with the drawing-chain will prevent the tag from rising and so becoming disconnected from the drawing mechanism.

The construction preferred by me as being simple and easily operated is shown in the drawings, the sleeve $f$ having the hook $g$ to enter the drawing-chain, and having the handle $f'$, by means of which the operator can hold the sleeve while passing it over the drawing-tag. This sleeve has any suitable form of catch for engaging with the head of the drawing-tag, that illustrated in the drawings being considered a simple form for the purpose, the catch $h$ being pivoted at the rear end of the sleeve and above the passage through the same, and being bifurcated in shape, having the slot or recess $i$ extending up from the base of the catch into the same, into which slot or recess the body of the drawing-tag fits, while the tangs $h'$, passing on each side of said recess, by fitting rather closely to said body are in position to engage with the head $e'$ of the drawing-tag, and so connect the said tag to the sleeve. For the purpose of raising said catch $h$ in disengaging the sleeve from the drawing-tag, I provide it with the thumb-piece $h^2$. The sleeve $f$ is grasped by the operator, who simply passes it over the end of the drawing-tag until the catch, which is raised by the head $e'$ thereof, falls back into its normal position on each side of the tag, and then simply drops the hook $g$ of the tag into the drawing-chain, this being all the work which is necessary, and the chain through the connecting-sleeve drawing back the tag $e$ and with it the plate E, which is bent or welded within the die $b$.

In the welding operation, in which my invention is more generally employed, I employ a second bell-holder, which has an open base, such bell-holder being shown more particularly in Fig. 3 of the drawings. This bell-holder is supported in a frame $k$, secured to the body of the draw-bench, and it may be either stationary therein, or, as preferred by me, it may be arranged to be upwardly and downwardly movable transversely of the draw-bench, this being found necessary in some cases, especially where the pipe sticks within the bell and it becomes necessary to raise the bell-holder out of the way to permit the removal of the pipe. I therefore have illustrated the bell-holder $l$ as mounted on the frame $k$ and sliding therein in guideways $k'$ on the frame, the bell-holder having the loop $l'$ at the upper end, which may be connected with a lifting-chain, so as to raise the bell-holder when necessary. The bell-holder just above the guideway $d$, in which the chain $c$ travels, has the opening or seat $n$, in which the second or reducing bell $m$ is caught, the seat $n$ having the open base $p$, as shown, so that the device engaging the tag with the chain can travel through that open base, and the reducing-bell $m$ can lodge in the seat $n$ and be held while the pipe is drawn through the same. In the upper end of the seat $n$ is the recess $r$, which is formed to permit the passage of the handle $f'$ of the sleeve, or a like handle employed directly upon the drawing-tag, as illustrated in an application of even date herewith, Serial No. 307,805.

In welding tubing in accordance with my invention, where the tube is drawn first through a welding-die and then through a reducing-die, I employ the plate E, having the drawing-tag $e$, above described. The operator passes over said drawing-tag the welding-bell $b$, which is dropped in front of the bell-holder $a$. He then passes over said drawing-tag the reducing-bell $m$, which rests around the tag back of the bell-holder $a$. He then grasps one of the sleeves $f$ and passes that over the end of the drawing-tag, the head $e'$ of said tag forcing back the catch $h$, which, as soon as it passes said head, drops around the body of the tag, and so causes the engagement of the sleeve and tag. As soon as the plate is at the proper heat for welding the operator simply drops the hook $g$ of the sleeve $f$ down into the drawing-chain $c$, and through this sleeve causes the engagement between the drawing-tag and said drawing-chain. The drawing-chain then carries back the sleeve and tag and draws the plate through the welding-bell $b$, causing the welding of the same into tubing. As the sleeve $f$ travels back it passes within the second bell-holder $l$, the open base of which permits the hook portion of the sleeve to pass through the same, while the recess $r$ at the upper end of the seat $n$ permits the passage of the handle $f'$, and as soon as the pipe is drawn entirely through the first bell the second or reducing bell engages with the seat of the second bell-holder, and is held from longitudinal motion thereby, and the pipe is drawn through this second bell, being so reduced and sized. As soon as this second welding or reducing operation is completed, the operator, standing at the rear of the draw-bench, simply grasps the sleeve by its handle and raises it out of the chain, and he can then, by slipping the sleeve back a short distance from the rear end of the tag and lifting the catch $h$ by the thumb-piece $h^2$, slip the sleeve off the drawing-tag. Each draw-bench may be provided with a large number of these sleeves, so that it is only necessary to carry the same at intervals from the rear to the forward end of the draw-bench and place them in position to be grasped by the welder and slipped over the drawing-tag. In case the pipe should stick within the second or reducing bell, all that is necessary is to raise the bell-holder, which will free the bell and the pipe therefrom, when this imperfect pipe can be withdrawn from the apparatus, and the second bell-holder can then be permitted to drop down into its normal position.

In the operation of the apparatus it is thus evident that by forming the second bell-holder with an open base I overcome all necessity of having any special operator to control the movement thereof either by setting the same so that it shall be moved automatically, as described in my former patent, or by moving the same forward to engage with the second bell, as is sometimes practiced. I am thus enabled by the improvements herein described to reduce the amount of labor necessary and to greatly simplify the operation of welding on such draw-benches.

What I claim as my invention, and desire to secure by Letters Patent, is—

1. In tube-making apparatus, the combination, with the drawing-tag secured to the plate or skelp, of a sleeve fitting around and engaging with the tag and having a hook to engage with the drawing-chain, substantially as and for the purposes set forth.

2. In tube-making apparatus, the combination, with the drawing-tag secured to the plate or skelp and having a head at one end thereof, of a sleeve fitting around the tag and provided with a catch engaging with said head and having a hook to engage with the drawing-chain, substantially as and for the purposes set forth.

3. In tube-making apparatus, the combination, with the drawing-tag having a head at one end thereof, of a sleeve having a swinging catch at one end fitting between the tag-head and sleeve and having the hook to engage with the drawing-chain, substantially as and for the purposes set forth.

4. In tube-making apparatus, the combination, with the drawing-tag having a head at one end thereof, of a sleeve slipping over the drawing-tag and having a hook to engage with the drawing-chain, and the pivoted catch having the forked end between which the body of the tag passes, the forks of the catch forming shoulders to engage with the head, substantially as and for the purposes set forth.

5. In tube-making apparatus, the combination of a draw-bench having a traveling chain, drawing mechanism adapted to engage both with the blank and said chain, and a bell-holder above the draw-bench, having an open base to permit the passage of the drawing mechanism, substantially as and for the purposes set forth.

6. In tube-making apparatus, the combination of a draw-bench having a traveling chain, drawing mechanism adapted to engage both with the blank and said chain, and a bell-holder above the draw-bench, said bell-holder being upwardly and downwardly movable transversely of the draw-bench, substantially as and for the purposes set forth.

In testimony whereof I, the said PETER PATTERSON, have hereunto set my hand.

PETER PATTERSON.

Witnesses:
CHARLES PATTERSON,
H. R. MAZURIE.